(12) United States Patent
Ferry et al.

(10) Patent No.: US 7,185,849 B2
(45) Date of Patent: Mar. 6, 2007

(54) PASSENGER ACCOMMODATION CABIN FOR A VEHICLE

(75) Inventors: David Ferry, Hove (GB); Adam Bernard Wells, Stapleford (GB); Luke Miles, London (GB)

(73) Assignee: Virgin Atlantic Airways Limited, West Sussex (GB)

( * ) Notice: Subject to any disclaimer, the term of this patent is extended or adjusted under 35 U.S.C. 154(b) by 0 days.

(21) Appl. No.: 10/486,069

(22) PCT Filed: Aug. 9, 2002

(86) PCT No.: PCT/GB02/03672

§ 371 (c)(1),
(2), (4) Date: Feb. 6, 2004

(87) PCT Pub. No.: WO03/013942

PCT Pub. Date: Feb. 20, 2003

(65) Prior Publication Data

US 2005/0012363 A1    Jan. 20, 2005

(30) Foreign Application Priority Data

Aug. 9, 2001  (GB) ................................ 0119457.0

(51) Int. Cl.
B64D 11/06 (2006.01)
(52) U.S. Cl. .................. 244/118.6; 105/316; 105/321; 5/9.1

(58) Field of Classification Search ............. 244/118.5, 244/118.6; 105/314, 315, 316, 321, 319, 105/323; 5/9.1
See application file for complete search history.

(56) References Cited

U.S. PATENT DOCUMENTS

| 2,946,294 | A | * | 7/1960 | Murphy | ...................... 105/315 |
| 2,960,292 | A | * | 11/1960 | Pitta | ........................ 244/118.5 |
| 4,589,612 | A | * | 5/1986 | Halim | ..................... 244/118.6 |
| 6,257,523 | B1 | * | 7/2001 | Olliges | .................... 244/118.5 |

FOREIGN PATENT DOCUMENTS

| DE | 10045138 A1 | 4/2002 |
| EP | 035955 A | 9/1981 |
| JP | 10 25877 A | 4/1998 |
| WO | WO 01/30639 A1 | 5/2001 |

OTHER PUBLICATIONS

International Search Report dated Sep. 27, 2002, application No. PCT/GB02/03672.

* cited by examiner

Primary Examiner—Robert P. Swiatek
(74) Attorney, Agent, or Firm—RatnerPrestia

(57) ABSTRACT

A passenger accommodation cabin for a vehicle, particularly an aircraft includes a wall defining a passenger accommodation area; a plinth disposed substantially at floor level and adapted to support a mattress within the accommodation area to provide at least one substantially flat bed; a false floor that is selectively movable between a deployed position in which the false floor at least partially covers the mattress and a retracted position for allowing use of the bed; and a seating system having at least one seat and associated supporting structure for supporting the seat within the accommodation area generally above the mattress.

35 Claims, 6 Drawing Sheets

PASSENGER ACCOMMODATION CABIN FOR A VEHICLE

This is a U.S. National Phase of International Application No. PCT/GB02/03672 filed Aug. 9, 2002.

The present invention relates to a novel passenger accommodation cabin for a vehicle. The accommodation cabin of the invention may be used on any passenger vehicles, including railway carriages, passenger ferries and coaches, but is particularly suited for use on an aircraft. More specifically, the accommodation cabin of the present invention is adapted for use in a first-class section of a passenger aircraft.

A conventional passenger aircraft seat comprises a seat pan and a backrest and a supporting structure for supporting the seat off the floor of the aircraft, which supporting structure is provided with suitable fixings for securing the seat to seat tracks in the floor. Typically, the backrest of an aircraft seat is capable of reclining to an extent to provide a more comfortable sitting position for a passenger during the course of a flight. Seats for use in the business and first-class sections of a passenger aircraft typically also comprise a leg-rest which can be selectively moved between a stowed position and a deployed position in which the leg-rest is adapted to support the passengers legs in a raised position during the flight. Whilst the seats for use in the business and first-class sections of an aircraft can generally recline to a greater extent than seats for use in the remainder of the aircraft, they still cannot go completely flat. Many passengers find it very difficult to sleep in a sitting position, with the result that they can become extremely tired over the course of a long-haul flight of many hours duration.

GB2326824A discloses a passenger seat that is suitable for use in a first-class section of a passenger aircraft. The seat of GB2326824A comprises a primary seat having a backrest, seat pan and leg rest and an opposing secondary seat which is positioned forwardly of the primary seat. The primary seat is provided with suitable supporting structure for supporting the primary seat off the floor of the aircraft, and the primary seat is adapted to move forwardly as it reclines such that in the fully reclined position, with the backrest fully reclined and the leg rest fully extended, the leg rest mates with the secondary seat to form an extended surface. Moreover, in the fully reclined position, the backrest, seat pan, leg rest and secondary seat form a continuous, substantially flat surface on which a passenger may sleep. The seat of GB2326824A thus represents a substantial improvement over conventional passenger aircraft seats which cannot go completely flat.

An object of the present invention is to provide improved passenger accommodation for vehicles, particularly aircraft.

In particular it is an object of the present invention to provide improved accommodation that is suitable for use in the first-class section of a passenger aircraft.

More particularly, an object of the present invention is to provide novel passenger accommodation means which provide a seat for a passenger to sit on and a flat bed which approximates as close as possible normal beds for use on land on which the passenger may sleep.

Accordingly, the present invention provides a passenger accommodation cabin for a vehicle, particularly an aircraft, which cabin comprises wall means defining a passenger accommodation area, plinth means disposed substantially at floor level and adapted to support mattress means within said accommodation area to provide at least one substantially flat bed; false floor means that are selectively movable between a deployed position in which said false floor means at least partially cover the mattress means and a retracted position for allowing use of said bed; seating means comprising at least one seat and associated supporting structure for supporting said seat within the accommodation area generally above the mattress means.

The passenger accommodation cabin of the present invention is particularly suitable for use in a first-class section of a passenger aircraft and provides a defined area for use by a passenger which incorporates a seat and a bed. The bed is normally at least partly concealed by the false floor means, but may be revealed to allow access to the bed when the passenger wishes to go to sleep.

Said wall means may comprise at least three upstanding side walls which serve as a privacy screen around the accommodation area. In some embodiments the cabin may also be fitted with a ceiling. In some embodiments, where the cabin of the present invention is positioned adjacent a wall of the aircraft, then one of the cabin walls may be formed by the existing aircraft wall, for example an external side wall. Said cabin may have four upstanding walls, completely surrounding the accommodation area, wherein the cabin further comprises door means for gaining entry into the accommodation area from outside. One or more of said walls may be full-height walls in that they extend from floor level to the ceiling. Preferably three walls at least are full-height walls. Where the cabin includes a fourth wall, said fourth wall may be arranged to be disposed adjacent an aisle in a passenger cabin of a vehicle and may be "half" or "three-quarter" height in that it does not extend fully to the ceiling. Said fourth wall may be dimensioned to provide a privacy screen when a passenger lies on the bed within the cabin, but can be seen over when the passenger is seated upon said seating means ("half-height") or when said passenger is standing within the cabin ("three-quarter" height). Said door means may comprise a closure, but in some embodiments may simply comprise a gap between two walls or parts of the same wall. In a particular embodiment, said gap may be formed in said fourth wall to provide convenient access to and from the cabin from the aisle.

The dimensions of said plinth means may correspond substantially to the dimensions of the cabin overall. Thus, said plinth means may have substantially the same dimensions as the mattress means. In some embodiments, said plinth means may additionally provide support for the wall means off the floor of the aircraft. Alternatively, said wall means may be adapted to be attached directly to the aircraft floor, and the plinth means of the cabin of the present invention may be accommodated within said wall means. Preferably, said plinth means forms a close fit around the mattress means, and the walls of the cabin substantially follow the edges of the plinth means such that the plinth means forms a close fit within the wall means.

Said plinth means may define a recess for accommodating said mattress means, such that said plinth means forms a tray for supporting the mattress. Alternatively, said plinth means may have a substantially flat upper surface adapted to support the mattress means thereon.

Said plinth means may be equipped with suitable fixings for attachment to tracks in the floor of the vehicle, for example seat tracks in an aircraft floor. In some embodiments, a single plinth may be adapted to support wall means defining a plurality of accommodation cabins according to the invention. Preferably, said plinth means are configured such that a plurality of plinth means may be arranged within a vehicle in a contiguous arrangement.

The elongate tray may be configured to provide a close fit around the mattress means, and the walls of the cabin may substantially follow the edges of the tray means. Thus the tray may form a close fit within the walls.

In order to optimise the use of space within the aircraft cabin, the accommodation cabin of the invention may have a generally rectangular footprint having substantially the same dimensions as the bed. Alternatively, the foot print of the cabin may have any other suitable, elongate shape, e.g. ellipsoidal, polygonal.

Means may be provided for building up the vehicle floor around the passenger accommodation cabin to provide a substantially continuous floor level. Alternatively, the plinth of the accommodation cabin may provide a step up into the accommodation area.

Said seating means may comprise a seat juxtaposed one end of the passenger accommodation cabin in juxtaposition with one short side wall, a "short side wall" being one which is oriented transversely to the longitudinal axis of the mattress means. In some embodiments, the seating means may comprise two opposing seats, in which case each seat may be positioned in juxtaposition with an opposing one of the short side walls. The or each seat may be adapted to recline forwardly within the cabin over the mattress means.

In some embodiments, the or each seat may comprise a backrest portion that is permanently fixed to a wall of the accommodation cabin and a seat pan that is pivoted to the backrest or the cabin wall juxtaposed the backrest for movement between a deployed position and a stowed position. Suitable means may be provided for retaining the seat pan in the deployed position such that the passenger may sit on the seat. Means may be provided for releasing the seat pan from the deployed position to allow it to be moved manually or automatically to the stowed position. In the stowed position, the seat pan may be pivoted upwardly or downwardly with respect to the backrest portion. It is desirable that in the stowed position, the seat pan should be folded away, flat against the backrest portion or a wall of the accommodation cabin so as to maximise the available space within the cabin above the bed.

Said false floor means may comprise one or more rigid or semi-rigid, substantially flat panels adapted to overlay at least part of said mattress means in a deployed position and removable to allow use of said bed. Said panel or panels may be hingedly connected to said plinth means and/or one or more of the walls to allow the or each panel to be hinged between a deployed position and a stowed position in which the panel is removed from the mattress means and is disposed substantially flush with one of the walls or is accommodated within a recess adapted for that purpose. Said panel(s) may be stowed horizontally or vertically. Suitably said panel(s) should at least overlay the mattress means in a zone forwardly of a seat within the cabin. In some embodiments the panel(s) may cover substantially the entire internal floor area of the cabin. Where said cabin comprises two opposing seats. Said panels may cover the mattress means between said two seats.

In a preferred aspect of the invention, said cabin may comprise a longitudinal half or three-quarter height wall having a gap formed therein to allow access to the interior of the cabin. Said false floor means may comprise one or more flat panels adapted to extend transversely across the bed means from the one longitudinal side to the other longitudinal side. The or each panel may be hinged to said tray means within said gap by hinge means. Said panel or panels may have overall dimensions slightly smaller than the gap. Said panel or panels may thus be pivotable between a deployed position in which the panel or panels extend transversely across the bed and an intermediate stowed position in which the panel or panels are oriented at about 90° to the deployed position and are received within the gap between two portions of the longitudinal wall. Said hinge means may be mounted to the tray means on sliding means adapted to travel longitudinally relative to the bed between an extended position in which the panel or panels are disposed in said intermediate stowed position in the gap and a retracted position in which the or each panel in the substantially vertical orientation is received juxtaposed or within a respective cavity formed in a respective one of the longitudinal wall portions in a fully stowed position. Where two or more panels are provided, said panels may be accommodated within a recess or recesses formed in the same longitudinal side wall portion or in respective recesses formed in both side portions to either side of the gap. Thus, by a two-step action, the false floor panel or panels may be moved between said deployed position in which it or they extend over the mattress means and the fully stowed position in which it or they are accommodated, preferably entirely, within a recess or recesses defined by said wall portion or portions or are disposed juxtaposed said wall portion or portions.

Where necessary and/or desired said false floor means may further comprise reinforcing means adapted to strengthen the floor panel(s), particularly when disposed in the deployed position, to enable said false floor means to support the weight of at least one and preferably two or more passengers.

In some embodiments, said false floor means may comprise flexible tambour means selectively moveable between a deployed position and a stowed position. Said tambour means may comprise at least one articulated panel comprising a plurality of elongate segments that are pivotally joined to one another along a plurality of respective parallel axes. Said tambour means may thus comprise one or more generally rectangular panels, each panel comprising a plurality of articulated slats that allow the panel means to flex about a plurality of spaced axes. In the deployed position, said tambour means may be adapted to cover substantially all, or part, of the tray means and reinforcing means may be provided for strengthening those ares of the tambour means when fully deployed where passengers and/or cabin crew are likely to stand or travel particularly in part of a seat or between two opposing seats. Tambour housing means may be provided juxtaposed the plinth means, within said plinth means or beneath said plinth means for receiving and accommodating said tambour means when stowed. Said housing means may further incorporate suitable guiding means for smoothly guiding movement of the tambour panel(s) between the stowed and deployed positions. Said tambour means may be adapted for movement between said stowed and deployed positions in a direction substantially parallel to or transverse the longitudinal direction of the bed.

In some embodiments of the present invention, said mattress means may have the dimensions of a single bed or bunk. In other embodiments said mattress means may comprise a double-bed. For flexibility of accommodation, said cabin may comprise two spaced mattresses. Thus, said plinth means may comprise two recesses, each adapted to accommodate a respective one of said mattresses. Said mattresses may be arranged side-by-side and said walls may closely surround said two mattresses. Screen means may be disposed between the two beds to afford privacy to the respective passengers using them. Said privacy screen means are preferably selectively movable between a deployed position and a stowed position to allow them to be removed if the passengers using the two beds are travelling together and/or wish to communicate with each other.

Alternatively, two passenger accommodation cabins according to the invention may be arranged contiguously side-by-side. A removable interconnecting side wall that is common to both cabins may be provided such that where the two cabins are used by two passengers who are travelling together, the interconnecting wall may be removed to create a double-spaced cabin comprising two beds side-by-side or, optionally, a double bed, where a single set of linen is used to dress the beds in both cabins.

Following is a description by way of an example with reference to accompanying drawings of the embodiments of the present invention.

Figure 1:
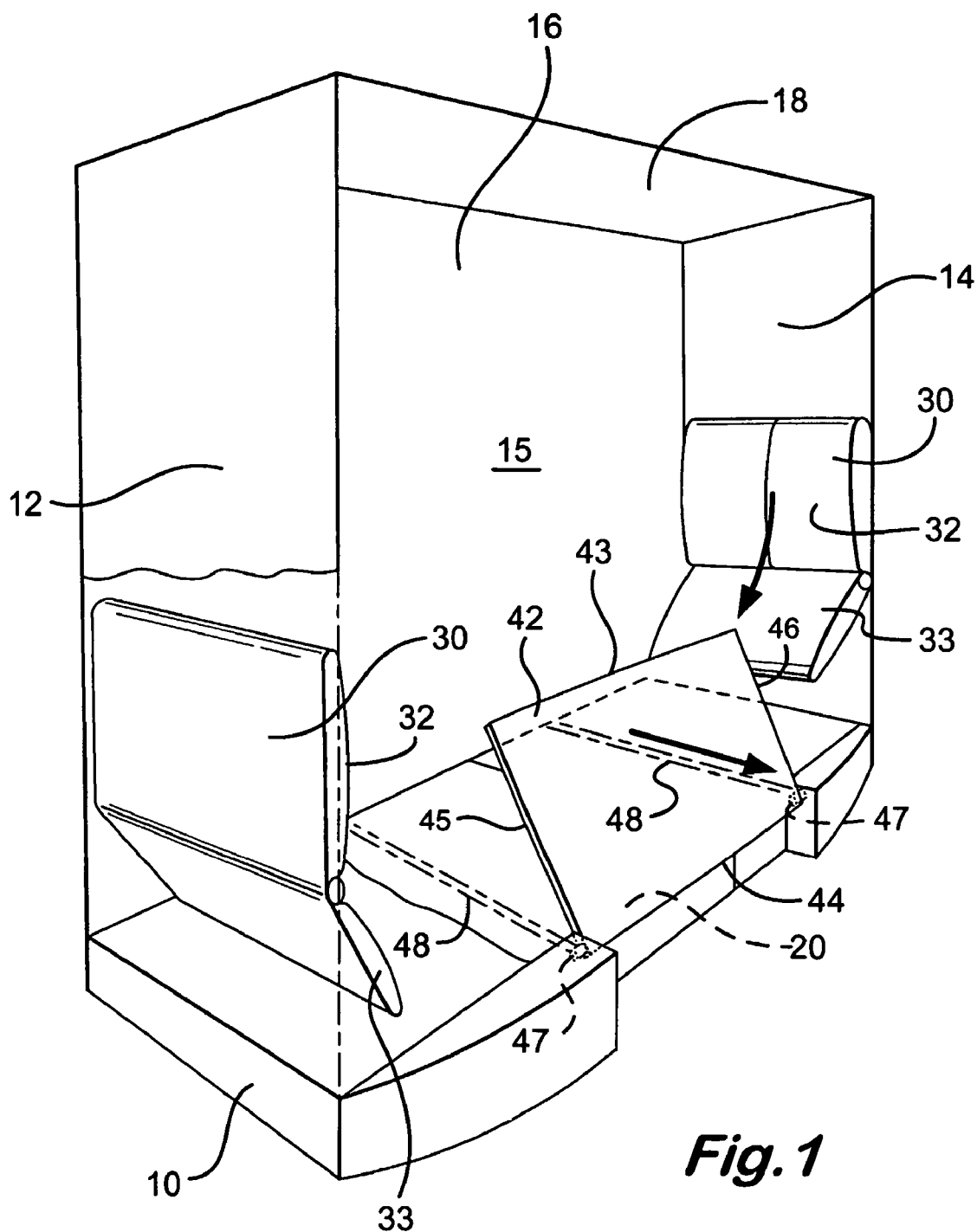
FIG. 1 is a schematic, isometric view of a first passenger accommodation unit according to the present invention which comprises two opposing seats.
Figure 2:
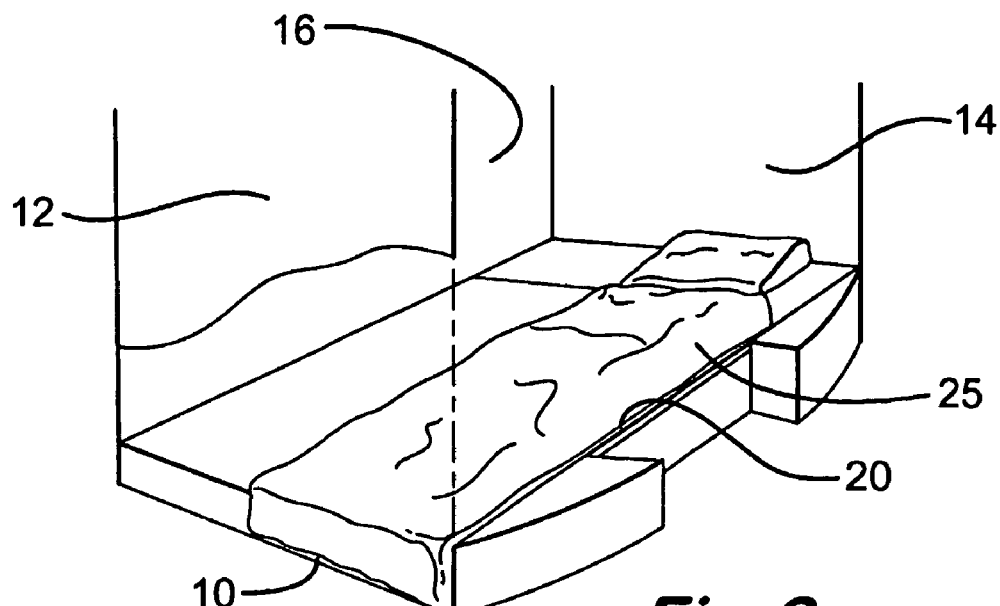
FIG. 2 shows the first accommodation unit of FIG. 1 in a bed mode.

With reference to FIGS. 1 and 2 of the accompanying drawings, a passenger accommodation unit according to the present invention comprises a plinth 10 that is provided with suitable fixings (not shown) for attaching the plinth to seat tracks in the floor of an aircraft. Mounted to said plinth 10 are three upstanding side walls comprising two opposing narrow side walls 12, 14 and interconnecting long side wall 16. Said side walls 12, 14 carry a rectangular, generally flat ceiling panel 18 at ceiling height above the plinth 10. Said side walls 12, 14, 16 are shown in FIGS. 1 and 2 as being solid walls, but where the unit of the invention is positioned in an aircraft cabin adjacent a wall comprising one or more windows, then one or more of the side walls 12–16 of the accommodation unit may be provided with corresponding windows to allow a passenger using the unit to see out through the aircraft windows. Alternatively, one of the side walls of the unit, preferably said long side wall 16 may be formed by a pre-existing side wall of the aircraft.

Said side walls 12–16 and ceiling panel 18 define a generally cuboidal passenger accommodation area 15.

Said plinth 10 has an upper surface 20 formed with a generally rectangular recess to accommodate a mattress 25 having the dimensions of a single adult bed. The side walls 12–16 of the unit are disposed closely adjacent the mattress 25, such that the mattress 25 occupies substantially the entire floor area of the unit. Thus, said narrow opposing side walls 12, 14 may be spaced apart by a distance of at least 6 feet (1.83 meters), and the width of the accommodation area in the direction substantially parallel to said narrow side walls 12 and 14 may be at least 2.5 feet (76.2 centimetres), preferably at least 3 feet (91.4 centimetres). Alternatively, said accommodation area could be dimensioned to accommodate an adult double-bed or two spaced "twin" single beds.

Each of said narrow side walls 12, 14 is reinforced or formed from a suitable aircraft grade, lightweight, load-bearing structural material and carries a passenger seat assembly 30. Each passenger seat assembly 30 comprises a backrest 32 that is permanently fixed to the respective narrow side walls 12, 14 and a seat pan that is mounted below the backrest and is pivoted to the narrow side wall 12, 14 or said backrest for movement between a deployed position in which the seat pan extends outwardly from said narrow side wall 12, 14 to form a seat on which a passenger may sit and a stowed position in which the seat pan is folded down relative to the backrest against the respective narrow side wall 12, 14. Suitable securing means are 1 provided for releasably securing the seat-pan in the deployed position. In the stowed position, the seat-pan is positioned substantially flush against the respective narrow side wall 12, 14 of the combination cabin.

Said plinth 10 accommodates a movable false floor that is adapted normally to cover the mattress 25 within the accommodation cabin and which may be removed and stowed to allow use of the mattress when a passenger that is using the cabin wishes to go to bed.

Said false floor comprises a generally rectangular, rigid central panel 42 that is adapted to overlay a central portion of a mattress between the two opposing seat assemblies 30. In the deployed position, the central panel 42 is supported at each end by the edges of the plinth 10 to support the weight of a passenger walking or standing thereon. Said central panel 42 comprises two opposing long sides 43, 44 that are oriented substantially parallel to the longitudinal axis of the bed and two opposing short sides 45, 46 that extend across the bed. Juxtaposed one of said long sides 44 that is remote from said long side wall 16, each of said short sides 45, 46 comprises a protruding lug 47 that is accommodated within a respective track 48 formed in the plinth 10 beneath the mattress 25. Said panel 42 can pivot about said lugs 47 and can slide in said tracks 48 to allow the panel 42 to be stowed within the plinth beneath the mattress 25. Thus to manoeuvre the panel 42 from the deployed position to the stowed position the other long side 43 of the panel is lifted away from the mattress to pivot the panel 42 about said lugs 47. The panel 47 is then slid along the tracks 48 until the panel is disposed beneath the mattress.

In a "seat mode" one or both of said seat assemblies 30 may be positioned with their respective seat-pans 33 in the deployed position to allow one or two passengers within the accommodation area 15. Said accommodation area is principally adapted for use by a single passenger who will use one of said seat assemblies 30, but the other seat assembly 30 may be provided for a travelling companion to sit with the passenger during the course of a flight. Conveniently, said accommodation unit may comprise a stowable table assembly (not shown) that may be deployed between the two opposing seat assemblies 30 so as to allow one or two passengers using the unit to dine within the accommodation area.

When the passenger wishes to go to sleep, the seat-pans 33 of the two seat assemblies 30 are released from their deployed positions to allow these seat-pans to fold downwardly with respect to their respective backrest 32 to lie flat against the respective narrow side walls 12, 14. The central panel 42 may be removed from its deployed position to its stowed position as described above thereby allowing complete access to the mattress as shown in FIG. 2. Said mattress may be made-up with conventional sheets, blankets and pillows as illustrated in FIG. 2 to provide a comfortable bed for a passenger, which is particularly advantageous on a long-haul flight.

Figure 3:
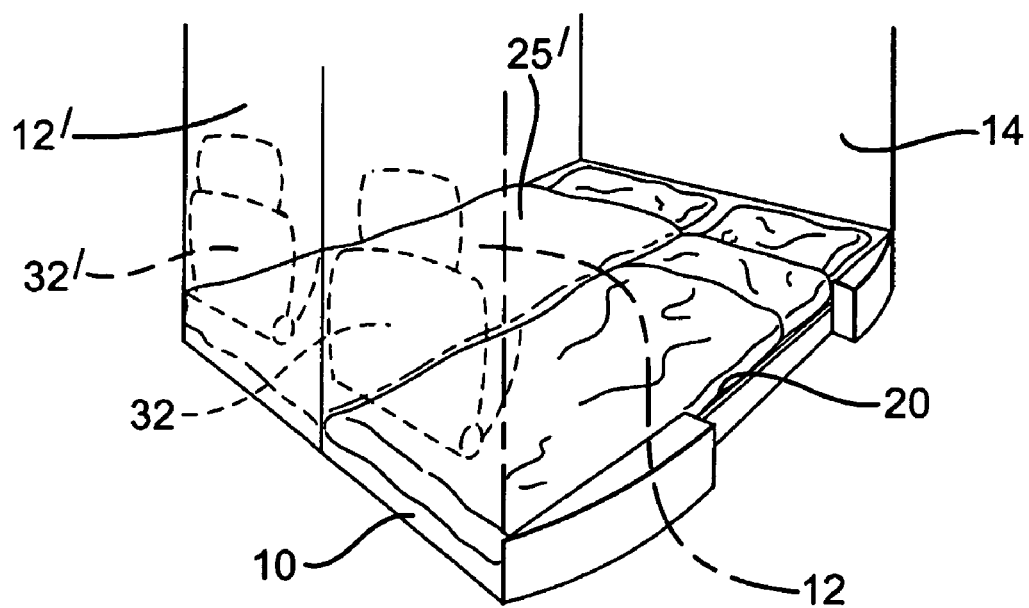
FIG. 3 is an isometric view of two passenger accommodation units in accordance with the present invention that are arranged contiguously side-by-side to provide a double unit.

FIG. 3 shows two accommodation units as hereinbefore described arranged contiguously side-by-side with the long side wall 16 between them removed so as to form a double unit, optionally having a double bed. In FIG. 3, the side wall 12', mattress 25' and back-rest 52' of the neighbouring unit are shown.

Figure 4:
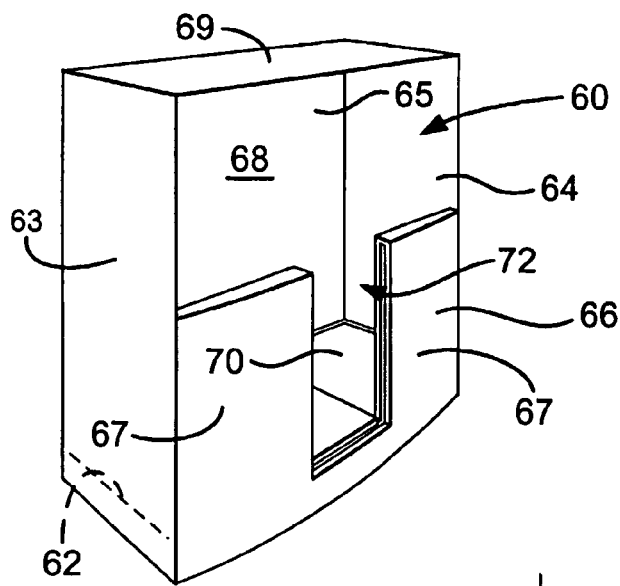
FIG. 4 is a schematic isometric view of a second different passenger accommodation unit according to the present invention.

FIG. 4 shows a different passenger accommodation unit 60 according to the present invention comprising a generally rectangular plinth 62 that supports a mattress 70 within an accommodation area 68. Said accommodation area 68 is formed by two upstanding opposing short side walls 63, 64, long side wall 65 and an opposing longitudinal "half-height" wall 66 that is cut away in a central region to form two wall portions 67. The two opposing short walls 63, 64 and said longitudinal side wall 65 are full-height walls and carry in their upper extremities a ceiling 69. As can be seen from FIG. 4, the half-height longitudinal wall 66 does not extend fully up to the ceiling 69, but terminates approximately half way between the floor and ceiling. The accommodation area accommodates seating means (not shown) of the kind described above, and the seating means and half-height wall are arranged such that when a passenger or passengers are seated on the seating means, he or they may see easily over the top of the half-height wall 66. The gap 72 formed between the two half-height wall portions 67 forms a doorway to allow access from outside into the interior of the accommodation unit 60.

Figure 5A:
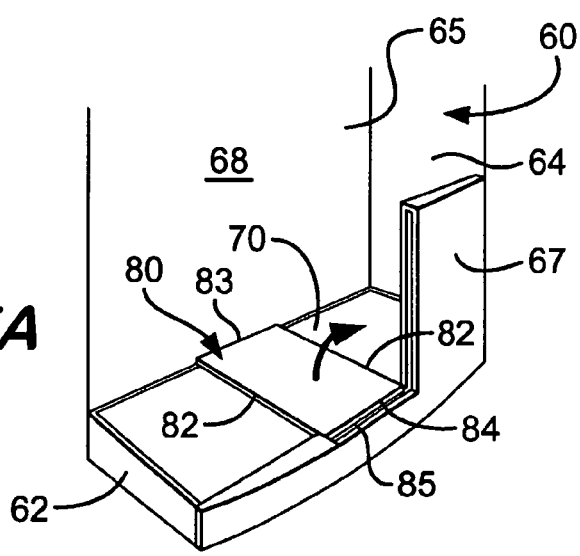
FIGS. 5A–5E show schematically the mechanism for stowing a false floor panel of the second accommodation unit of FIG. 4.
Figure 5B:
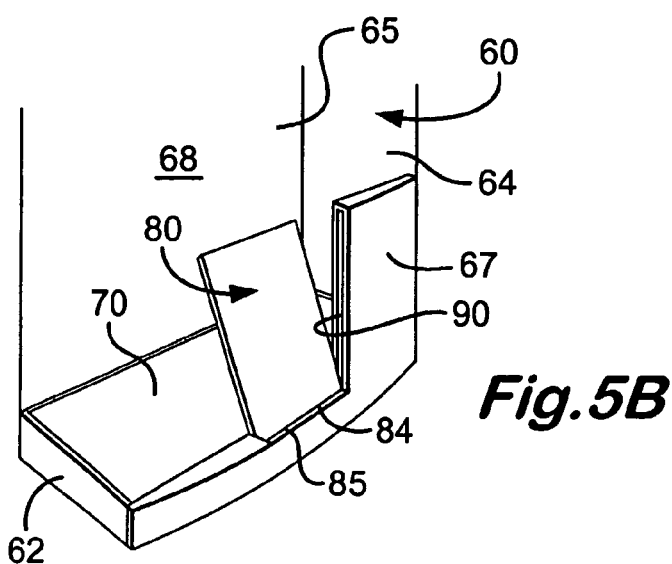

As best seen in FIG. 5A, in which the ceiling 69, one of the short side walls 63 and one of the half-height longitudinal wall portions 67 have been removed for clarity, the accommodation unit 60 comprises a generally rectangular false floor panel 80 having two opposing long sides 82 and two opposing short sides 83, 84. One of said short sides 84 is mounted pivotably and slidingly to the plinth 62 between the two half-height wall portions 67 at 85. Said one short edged 84 is oriented substantially parallel to the longitudinal axis of the mattress 70, and the joint between the panel 80 and the plinth 62 allows the panel 80 to be pivoted as shown in FIG. 5A between a deployed position of FIG. 5A and an intermediate stowed position in which the panel is oriented substantially orthogonally to its deployed position and occupies the gap 72 between the two half-height wall portions 67; FIG. 5B shows the panel 80 almost in the intermediate deployed position. As can be seen, the length of the panel 80 between the two short edges 82, 84 is slightly less than the height of the half-height wall 66 between the plinth 62 and its upper extremity, and the width of the panel 80 between the two long edges 82 is about the same as the width of the gap 72 between the two wall portions 67 in the longitudinal direction of the bed.

Figure 5C:
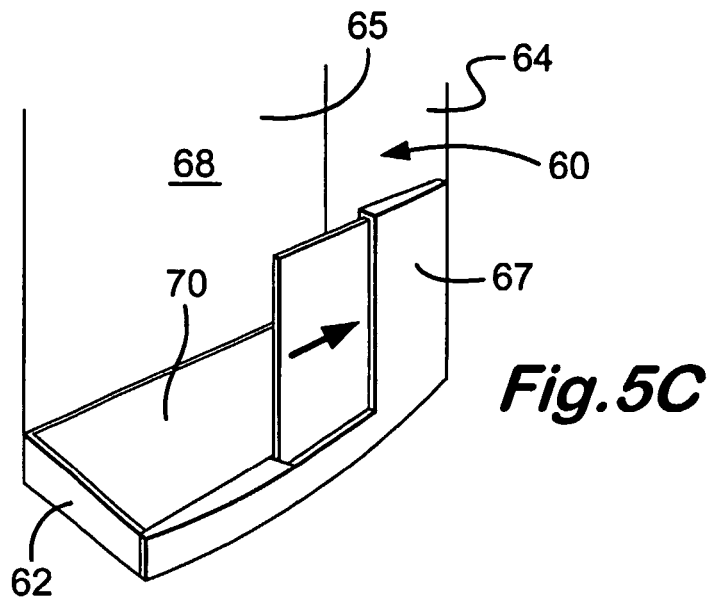
Figure 5D:
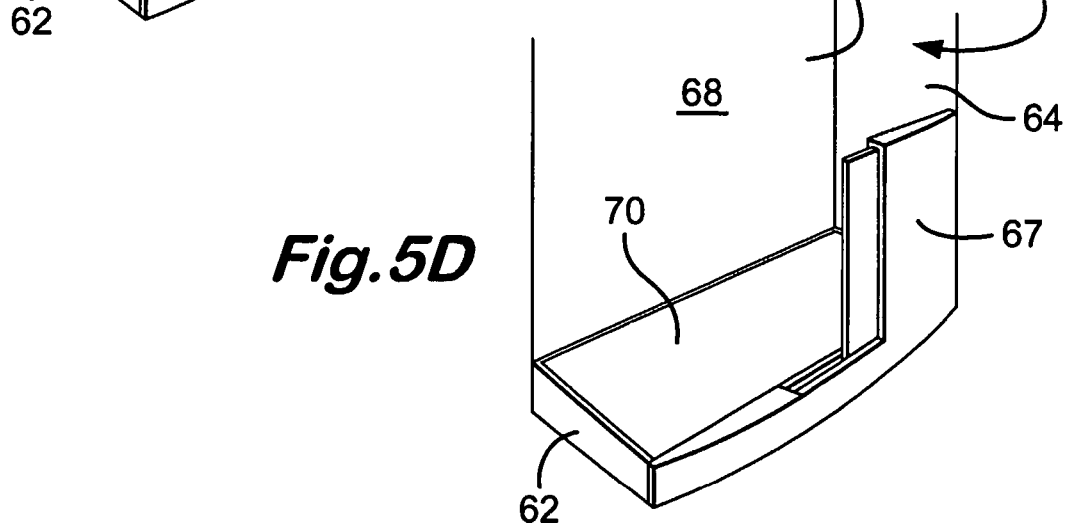
Figure 5E:
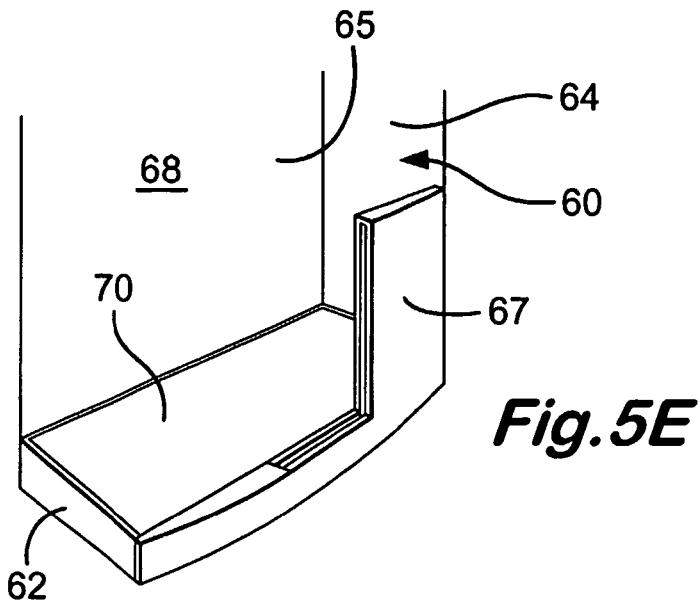

As best seen in FIGS. 5B–5E, at least one of said half-height wall portions 67 defines a longitudinally extending recess 90 which is dimensioned to accommodate fully the false floor panel 80. The sliding joint 85 between the panel 80 and the plinth 62 extends into the recess 90 such that when the panel is in the intermediate stowed position, it may be then slid as shown in FIGS. SC and 5D longitudinally relative to the mattress 70 into recess 90 to a fully stowed position as shown in FIG. 5E in which the panel 80 is completely concealed within the wall portion 67.

In the deployed position as shown in FIG. 5A, the false floor panel 80 extends fully across the mattress 70 and is supported at its short edge 83 by the plinth 62. The panel 80 is made from a suitable aircraft standard light-weight structure material which is sufficiently strong to enable one or more passengers to stand and walk on the panel 80. The panel 80 thus partially covers and protects the mattress 70 when not in use and allows a passenger to stand within the accommodation unit 60 to gain access to the seating means. When the passenger desires to go to bed, the panel 80 is pivoted as shown in FIGS. 5A and 5B and then slid as shown in FIGS. 5C–E to the fully stowed position to allow full access to the mattress 70. The seating means may be stowed as described above, so that the passenger may use the bed 70.

Figure 6:
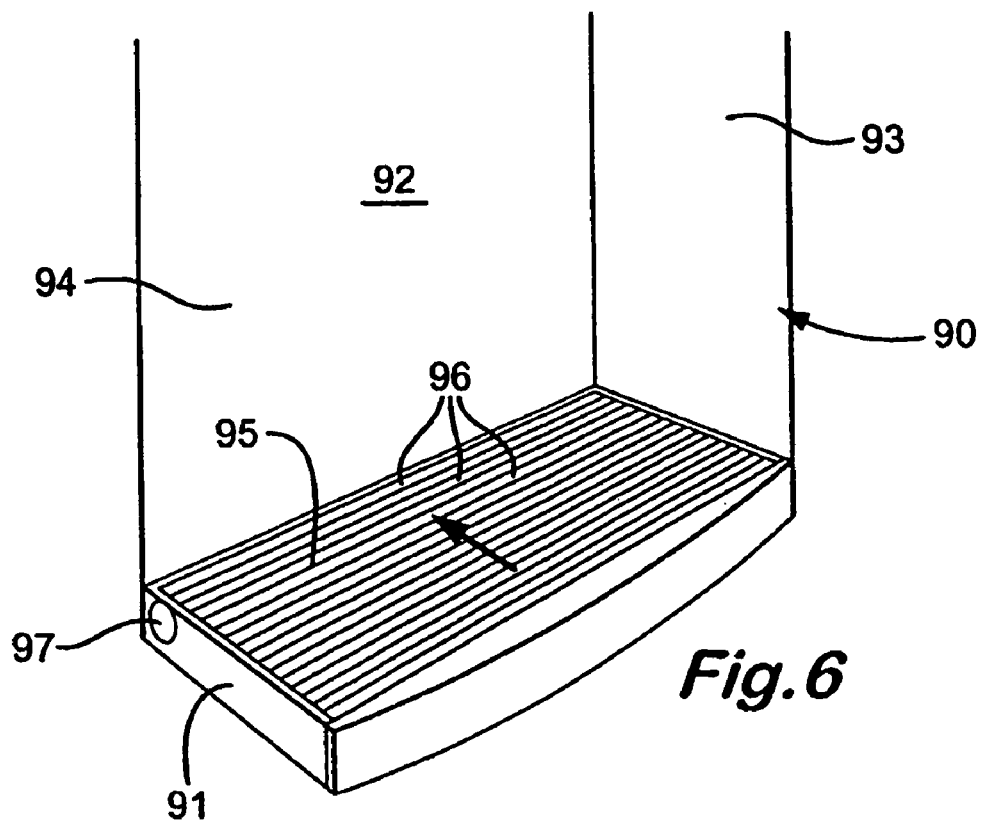
FIG. 6 is a schematic, isometric view of a third different passenger accommodation unit according to the present invention in which the ceiling and one end wall have been omitted for clarity.

FIG. 6 shows another passenger accommodation unit 90 in accordance with the present invention comprising a generally rectangular plinth 91 that supports a mattress (not shown) within an accommodation area 92. Said accommodation area is formed by two opposing short side walls of which only one 93 is shown and an interconnecting long side wall 94. A second long side wall opposing said interconnecting wall 94 may be provided if desired. Said side walls 93, 94 also carry an optional ceiling (not shown). The accommodation area 92 accommodates seating means (not shown) of the kind described above.

The accommodation unit 90 of FIG. 6 further comprises a flexible tambour 95 that is moveable between a deployed position as shown in FIG. 6 in which the tambour 95 extends across substantially the whole of the mattress means and a stowed position (not shown) in which the tambour is removed from the mattress means to allow substantially full access to the mattress means so that a passenger using the accommodation unit 90 may go bed.

As can be seen from FIG. 6, said tambour 95 comprises a plurality of contiguous, longitudinally extending, thin slats 96, each of which is connected to its neighbouring slats by a longitudinal joint that extends substantially parallely to the longitudinal axis of the mattress means. Said tambour 95 thus forms a semi-rigid panel, and the joints between adjacent slats 96 allow the tambour 95 to be rolled-up. Accordingly, said plinth 91 accommodates, towards one lateral side, a longitudinally extending, elongate roller 97 for storing the tambour in its stowed position. Said roller 97 is accommodated within a cavity formed in the plinth 91 that is sufficiently large to accommodate the roller and tambour 95 when rolled-up upon the roller 97. Said plinth 91 further accommodates suitable automatic drive means for driving the roller 97 for rolling and un-rolling the tambour 95 therefrom. A control panel may be provided within the accommodation area to allow a passenger or cabin crew to operate the roller 97 for moving the tambour between its deployed and stowed positions.

As can be seen from FIG. 6 in the deployed position, the tambour 95 extends substantially across the whole of the plinth 91 within the combination area 92 and substantially covers the mattress means. In the deployed position, the tambour 95 is substantially completely unrolled from the roller 97. When a passenger using the accommodation unit 90 wishes to go to sleep he/she operates the roller 97 to roll the tambour 95 thereonto such that the tambour is moved progressively transversely across the plinth 91 to reveal the mattress means that is rolled up on the roller 97. In the stowed position, the tambour 95 is substantially all accommodated upon the roller 97 such that the mattress means within the plinth 91 is substantially completely revealed. Suitable securing means may be provided for the securing the tambour 95 in its deployed position. For example, the tambour 95 and plinth 91 may be equipped with suitable interengaging fastening means.

Where necessary, the plinth 91 may be equipped with suitable reinforcing means for strengthening the tambour 95 in the deployed position to support the weight of a passenger standing thereon.

Figure 7A:
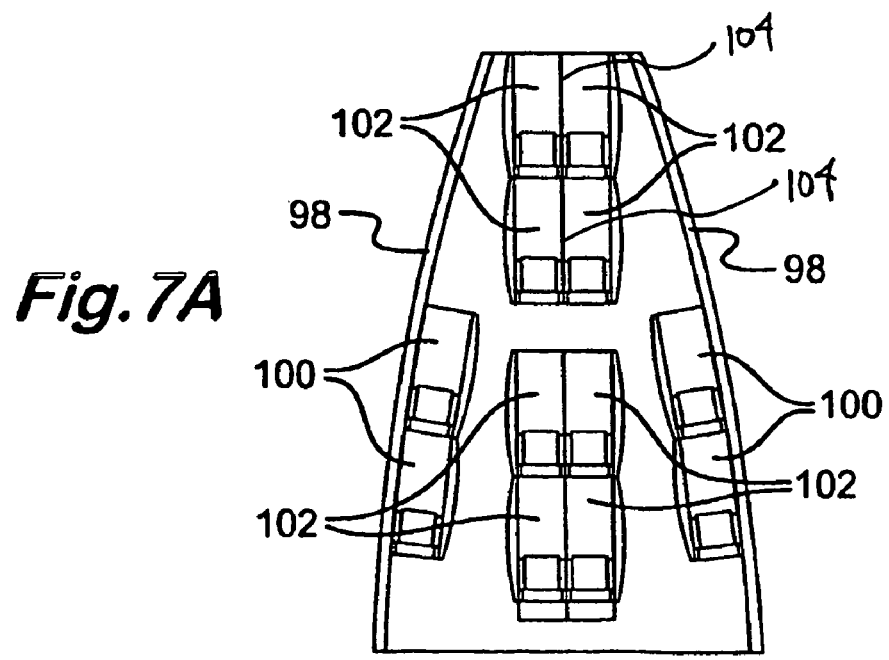
FIGS. 7A–7C show different aircraft cabin layouts incorporating a plurality of accommodation cabins according to the present invention.
Figure 7B:
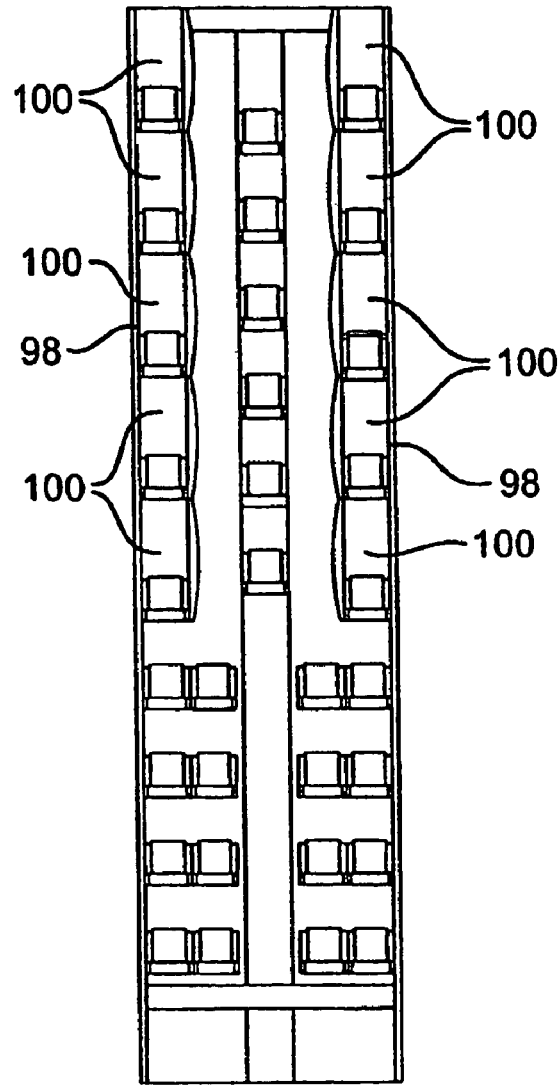
Figure 7C:
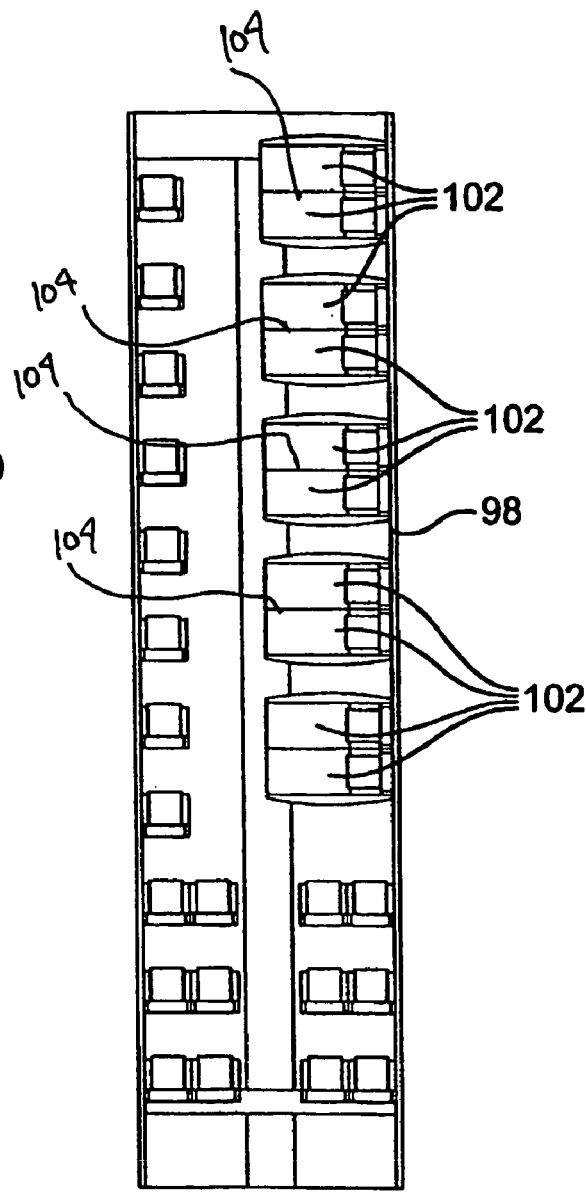

FIGS. 7A–7C show respectively three different cabin layouts incorporating passenger accommodation units as hereinbefore described. Thus FIG. 7A shows a passenger cabin in the nose of an aircraft which comprises four accommodation units 100 as hereinbefore described positioned juxtaposed the two side walls 98 of the aircraft cabin and eight accommodation units 102 arranged in four pairs along the central axis of the cabin, optionally to provide zero to four double cabins separated by one or more screens 104. The long side walls of the units 100 juxtaposed the aircraft walls may be omitted such that the long wall is formed by the aircraft wall itself.

FIG. 7B shows an aircraft cabin incorporating ten accommodation units as hereinbefore described which are arranged along the side walls 98 of the aircraft cabin.

FIG. 7C shows an aircraft cabin comprising five pairs of two accommodation units 102 as hereinbefore described in which, within each pair, the units 102 are arranged contiguously side by side, extending generally orthogonally to the aircraft cabin wall 98 to provide optionally zero to five double units, wherein one or more screens 104 are disposed between two of said mattresses to afford privacy to the respective passengers using them.

The present invention thus provides a passenger accommodation unit suitable for use in a first-class accommodation area of an aircraft which can be configured to provide a seating mode in which the accommodation area comprises one or two seats for passengers and a "bed mode" in which the accommodation area comprises at least one flat bed of normal dimensions which approximates as far as possible a conventional bed. When the unit is configured in the seating mode, the bed is at least partially concealed and protected by means of a removable false floor on which a passenger may stand. The accommodation unit of the present invention can be interconverted quickly and easily between the seating mode and bed mode and vice versa. Optionally, two accommodation units according to the present invention may be placed side by side without an interconnecting wall to provide a double unit for passengers wishing to travel together. A removable privacy screen may be provided between the units to afford privacy to their respective occupants if required.

The invention claimed is:

1. A passenger accommodation cabin for a vehicle, which cabin comprises:
   one or more walls defining a passenger accommodation area;
   a plinth disposed substantially at floor level and adapted to support a mattress within said accommodation area to provide at least one substantially flat bed;
   a false floor that is selectively movable between a deployed position in which said false floor at least partially covers the mattress and is directly supported by the plinth, and a retracted position for allowing use of said at least one bed; and
   at least one seat supported within the accommodation area generally above the mattress, said at least one seat being selectively movable between a deployed position for use as a seat when said false floor is in said deployed position and a retracted position for allowing use of said at least one bed when said false floor is in said retracted position.

2. A cabin as claimed in claim 1, wherein said one or more walls serve as a privacy screen around the accommodation area.

3. A cabin as claimed in claim 1, wherein four upstanding walls are provided, which walls completely surround the accommodation area, and wherein the cabin further comprises an access for gaining entry to the accommodation area from outside.

4. A cabin as claimed in claim 3, wherein one or more of said walls are full-height walls.

5. A cabin as claimed in claim 3, wherein at least three walls are full-height walls.

6. A cabin as claimed in claim 5, wherein said cabin includes a fourth wall which is adapted to be disposed adjacent an aisle in a passenger cabin of a vehicle and is a "half" or "three-quarter"-height wall.

7. A cabin as claimed in claim 6, wherein said fourth wall is dimensioned to provide a privacy screen when a passenger lies on the bed within the cabin, but can be seen over when the passenger is seated upon the seat or when the passenger is standing within the cabin.

8. A cabin as claimed in claim 6, wherein said access comprises a closure or a gap between two walls or parts of the same wall.

9. A cabin as claimed in claim 8, wherein said gap is formed in said fourth wall to provide convenient access to and from the cabin from the aisle.

10. A cabin as claimed in claim 1, wherein the dimensions of said plinth correspond substantially to the dimensions of the cabin.

11. A cabin as claimed in claim 10, wherein said plinth has substantially the same dimensions as said mattress.

12. A cabin as claimed in claim 1, wherein said plinth defines a recess for accommodating said mattress, such that said plinth forms an elongate tray for supporting said mattress.

13. A cabin as claimed in claim 12, wherein said tray is configured to provide a close fit around the mattress, and the walls of the cabin substantially follow the edges of the tray.

14. A cabin as claimed in claim 1, wherein said cabin has a substantially rectangular footprint having substantially the same dimensions as said bed.

15. A cabin as claimed in claim 1, wherein said seat comprises at least one seat that is positioned at one end of the cabin in juxtaposition with one short side wall thereof.

16. A cabin as claimed in claim 15, comprising two seats, the seats being positioned at opposing ends of the passenger accommodation cabin in juxtaposition with respective, opposing short side walls of the cabin.

17. A cabin as claimed in claim 15, wherein the or each seat comprises a back-rest that is fixed to a wall of the accommodation cabin and a seat-pan that is pivoted to the back-rest or the cabin wall juxtaposed the back-rest for movement between a deployed position and a stowed position.

18. A cabin as claimed in claim 1, wherein said false floor comprises one or more rigid or semi-rigid, substantially flat panels adapted to overlay at least part of said mattress in a deployed position and removable to allow use of said at least one bed.

19. A cabin as claimed in claim 18, wherein said one or more panels are connected by one or more hinges to said plinth, one or more of the walls, or said plinth and one or more of said walls to allow the or each panel to be hinged between a deployed position and a stowed position in which the or each panel is removed from the mattress and disposed substantially flush with one of the walls or accommodated within a recess adapted for that purpose.

20. A cabin as claimed in claim 18, wherein said false floor comprises one or more transverse panels which are adapted to extend transversely across the at least one bed from one longitudinal side to another.

21. A cabin as claimed in claim 20, wherein said cabin comprises a longitudinal half or three-quarter height wall having a gap formed therein to allow access to the interior of the cabin, and the or each transverse panel is connected to said tray within said gap.

22. A cabin as claimed in claim 21, wherein said one or more transverse panels are pivotable between a deployed position in which the or each panel extends transversely across the bed and an intermediate stowed position in which the or each panel is oriented substantially vertically and is received within the gap between two opposing portions of the longitudinal wall.

23. A cabin as claimed in claim 22, wherein said one or more hinges are mounted to the tray on a slide which extends longitudinally relative to the bed, said one or more hinges being adapted to travel along said slide between an extended position, in which the or each panel is disposed in said intermediate stowed position in the gap, and a retracted position in which the or each panel, in the substantially vertical orientation, is received juxtaposed, or within a respective cavity formed, in a respective one of the longitudinal wall portions in a fully stowed position.

24. A cabin as claimed in claim 18, wherein said one or more panels overlay the mattress at least in a zone forwardly of a seat within the cabin.

25. A cabin as claimed in claim 18, wherein said one or more panels cover substantially the entire, internal floor area of the cabin.

26. A cabin as claimed in claim 18, wherein said cabin accommodates two opposing seats, and the one or more panels cover the mattress between said two seats.

27. A cabin as claimed in claim 18, wherein said false floor is reinforced to strengthen the or each floor panel, to enable said false floor to support the weight of at least one passenger.

28. A cabin as claimed in claim 1, wherein said false floor comprises a flexible tambour selectively moveable between a deployed position and a stowed position.

29. A cabin as claimed in claim 28, wherein said tambour comprise at least one articulated panel comprising a plurality of elongate segments that are pivotally joined to one another along a plurality of respective parallel axes.

30. A cabin as claimed in claim 29, wherein a housing for said tambour is provided juxtaposed, within and beneath said plinth for receiving and accommodating said tambour when stowed.

31. A cabin as claimed in claim 1, comprising plural mattresses.

32. A cabin as claimed in claim 31, wherein one or more screens are disposed between two of said mattresses to afford privacy to the respective passengers using them.

33. A cabin installation comprising two cabins as claimed in claim 1, wherein two said cabins are arranged contiguously side-by-side and a removable interconnecting side wall that is common to both cabins is provided such that the interconnecting side wall can be removed to create a double-spaced cabin.

34. A passenger accommodation cabin for a vehicle, which cabin comprises:
   one or more walls defining a passenger accommodation area;
   a plinth disposed substantially at floor level and defining a recess for accommodating a mattress within said accommodation area to provide at least one substantially flat bed;
   a false floor that is selectively movable between a deployed position in which said false floor at least partially covers the mattress and is directly supported by the plinth, and a retracted position for allowing use of said at least one bed; and
   at least one seat mounted to said one or more walls.

35. A passenger accommodation cabin for a vehicle, which cabin comprises:
   opposed walls at least partially defining a passenger accommodation area;
   a plinth disposed substantially at floor level and adapted to support a mattress within said accommodation area to provide at least one substantially flat bed;
   a false floor comprising at least one panel that is selectively movable between a deployed position in which said false floor at least partially covers the mattress and is directly supported by the plinth, and a retracted position for allowing use of said at least one bed; and
   two opposing seats mounted to said walls wherein the at least one flat panel covers the mattress between said seats.

* * * * *